(12) United States Patent
Guidash

(10) Patent No.: US 7,969,469 B2
(45) Date of Patent: Jun. 28, 2011

(54) MULTIPLE IMAGE SENSOR SYSTEM WITH SHARED PROCESSING

(75) Inventor: R. Michael Guidash, Rochester, NY (US)

(73) Assignee: OmniVision Technologies, Inc., Santa Clara, CA (US)

( * ) Notice: Subject to any disclaimer, the term of this patent is extended or adjusted under 35 U.S.C. 154(b) by 552 days.

(21) Appl. No.: 11/947,980

(22) Filed: Nov. 30, 2007

(65) Prior Publication Data

US 2009/0141146 A1  Jun. 4, 2009

(51) Int. Cl.
*H04N 5/225* (2006.01)
*H04N 13/02* (2006.01)

(52) U.S. Cl. ............ 348/207.99; 348/47; 348/262

(58) Field of Classification Search .......... 348/47, 348/48, 153, 159, 207.99, 211.11, 262, 42, 348/43, 46, 51, 53, 211.12, 263, 264, 369, 348/373, 374, 211.99, 211.1, 211.2, 211.3, 348/211.4, 211.5, 211.6, 211.8, 211.14, 143; 396/322, 325, 324, 332, 333, 334, 335, 336
See application file for complete search history.

(56) References Cited

U.S. PATENT DOCUMENTS

| | | | |
|---|---|---|---|
| 7,139,473 B2 | 11/2006 | Shimano et al. | |
| 7,561,191 B2 * | 7/2009 | May et al. | ............ 348/240.2 |
| 2002/0108011 A1 | 8/2002 | Tanha | |
| 2003/0223001 A1 * | 12/2003 | Maeda et al. | ............ 348/273 |
| 2005/0041123 A1 | 2/2005 | Ansari et al. | |
| 2005/0128324 A1 * | 6/2005 | Kishi et al. | ............ 348/294 |
| 2005/0237424 A1 | 10/2005 | Weekamp et al. | |
| 2006/0050170 A1 * | 3/2006 | Tanaka | ............ 348/360 |
| 2007/0070204 A1 * | 3/2007 | Mentzer | ............ 348/207.99 |

FOREIGN PATENT DOCUMENTS

| | | |
|---|---|---|
| EP | 1 420 568 | 5/2004 |
| WO | WO 01/31893 | 5/2001 |

* cited by examiner

*Primary Examiner* — David L Ometz
*Assistant Examiner* — Peter Chon
(74) *Attorney, Agent, or Firm* — Blakely Sokoloff Taylor & Zafman LLP

(57) ABSTRACT

A primary integrated image sensor is operatively connected to one or more secondary image sensors. The primary integrated image sensor includes a pixel array integrated on a semiconductor substrate along with one or more of an image signal processing circuit, readout circuitry, a digital serial interface, storage, a timing circuit, an analog-to-digital converter, and a bi-directional digital input/output circuit. Each secondary image sensor can be implemented as a Complementary Metal Oxide Semiconductor (CMOS) or a Charge Coupled Device (CCD) image sensor and include a pixel array along with one or more of a readout circuitry, a digital serial interface, a timing circuit, an output circuit, and an optional analog-to-digital converter. Images captured by the primary integrated image sensor and each secondary image sensor are processed by the primary image sensor. Each secondary image sensor can also transmit physical and operational data to the primary integrated image sensor.

6 Claims, 5 Drawing Sheets

MULTIPLE IMAGE SENSOR SYSTEM WITH SHARED PROCESSING

FIELD OF THE INVENTION

The present invention relates to imaging systems, and more particularly to imaging systems with multiple image sensors and shared processing.

BACKGROUND OF THE INVENTION

Many mobile and handheld devices provide users with a variety of features and functions, including image capture. Examples of such mobile or handheld devices include cellular phones and personal digital assistants. FIG. 1A is a front perspective view of a cellular phone according to the prior art. Cellular phone 100 includes standard display 102, keypad 104 (numbers 0-9, # and *), speaker 106, microphone 108, and user input device 110. User input device 110 may be used to access or select the various features and functions of cellular phone 100.

Built-in digital camera 112 (see FIG. 1B) is used to capture still and video images. Typically a small display 114 is located on the outside 116 of cellular phone 100 to display the date, time, and various status icons such as the amount of battery charge and the signal strength. Digital camera 112 typically includes a single image sensor, such as a Charge Coupled Device (CCD) or Complementary Metal Oxide Semiconductor (CMOS) image sensor.

Because most mobile and handheld devices, such as cellular phone 100, include a single image sensor, it can be difficult to implement some applications, such as video conferencing. Camera 112 focuses on objects positioned in front of camera 112 while display 102 is located on the inside 118 (FIG. 1A) of cellular phone 100. This means a user cannot look at camera 112 to capture his or her image while simultaneously looking at the image on display 102.

As a result, some imaging systems have considered or implemented the use of multiple image sensors or multiple standard displays. These solutions, however, are more costly and challenging to implement, given the limited size of some imaging devices. Moreover, when multiple image sensors are utilized, many of the components included in an image sensor are duplicated in each image sensor.

SUMMARY OF THE INVENTION

A multiple image sensor system includes a primary integrated image sensor operatively connected to one or more secondary image sensors. In one embodiment in accordance with the invention, the primary integrated image sensor includes a pixel array integrated on a semiconductor substrate with an image signal processing circuit, readout circuitry, a digital serial interface, storage, a timing circuit, an analog-to-digital converter, and a bi-directional digital input/output circuit. The one or more secondary image sensors include a pixel array, readout circuitry, a digital serial interface, a timing circuit, and an output circuit. The output circuit on a secondary image sensor can be implemented as an analog output circuit or a digital output circuit. When a secondary image sensor includes a digital output circuit, the secondary image sensor further includes an analog-to-digital converter.

Images captured by the primary integrated image sensor and each secondary image sensor are processed by the image signal processing circuit on the primary integrated image sensor to produce rendered images. Images captured by each secondary image sensor are transmitted to the primary integrated image sensor for processing by the image signal processing circuit. Examples of the processing functions performed by the image signal processing circuit include, but are not limited to, color interpolation, white balance, and color and gamma corrections.

Each secondary image sensor transmits physical and operational data over the digital serial interface to the primary integrated image sensor in an embodiment in accordance with the invention. The primary integrated image sensor stores this data and adjusts one or more output signals associated with the image or images captured by the secondary image sensor based on the physical and operational data. By way of example only, a secondary image sensor can transmit its resolution to the primary integrated image sensor. The primary integrated image sensor then responsively generates synchronization signals, such as frame, line, and pixel clock signals, based on the resolution data received from that secondary image sensor.

These and other aspects, objects, features and advantages of the present invention will be more clearly understood and appreciated from a review of the following detailed description of the embodiments and appended claims, and by reference to the accompanying drawings.

ADVANTAGEOUS EFFECT OF THE INVENTION

The present invention includes the advantages of having the image signal processing circuitry and associated memory integrated on a single primary image sensor in a multiple image sensor imaging system. The integrated image signal processing circuitry receives and processes image signals from the pixel array on the integrated image sensor as well as image signals from one or more external secondary image sensors. The cost of the imaging system is reduced because the image signal processing circuitry and associated memory are included on only one image sensor, and not on all of the image sensors. Additionally, the development costs for imaging systems that employ image sensors of different resolutions can be reduced because the integrated image signal processing circuitry can generate customized rendered images using physical and operational data specific to each image sensor.

DETAILED DESCRIPTION OF THE INVENTION

Figure 1A:
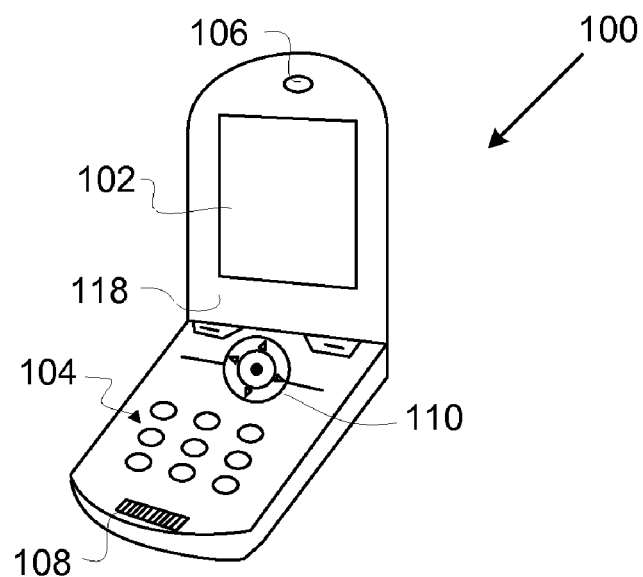
FIG. 1A is a front perspective view of a cellular phone according to the prior art.

Throughout the specification and claims, the following terms take the meanings explicitly associated herein, unless the context clearly dictates otherwise. The meaning of "a," "an," and "the" includes plural reference, the meaning of "in" includes "in" and "on." The term "connected" means either a direct electrical connection between the items connected, or an indirect connection through one or more passive or active intermediary devices. The term "circuit" means either a single component or a multiplicity of components, either active or passive, that are connected together to provide a desired function. The term "signal" means at least one current, voltage, or data signal. Referring to the drawings, like numbers indicate like parts throughout the views.

Figure 2:
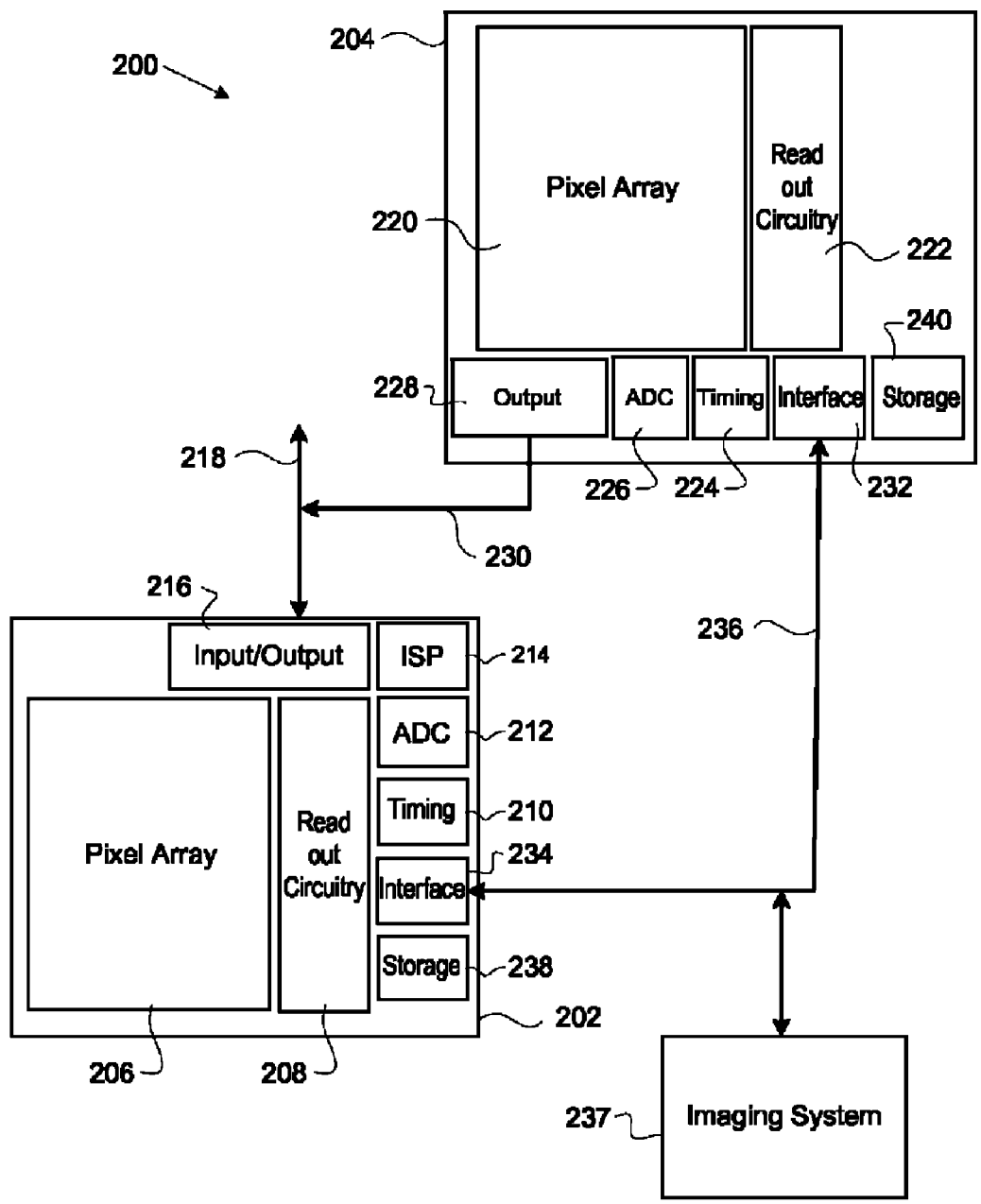
FIG. 2 is a block diagram of a first sensor system in an embodiment in accordance with the invention.

Referring now to FIG. 2, there is shown a block diagram of a first sensor system in an embodiment in accordance with the invention. Sensor system 200 includes primary integrated image sensor 202 operatively connected to secondary image sensor 204. Secondary image sensor 204 is external to primary integrated image sensor 202. Primary integrated image sensor 202 is implemented as a CMOS image sensor in an embodiment in accordance with the invention.

Primary integrated image sensor 202 includes pixel array 206 for capturing still or video images. Each pixel in pixel array 206 includes a photosensitive site (not shown) that captures light from a scene of interest and generates a charge representative of the amount of incident light. Each pixel further includes at least one output structure (not shown), such as a transistor or amplifier, to convert the charge to a voltage image signal. Readout circuitry 208 is then used to read out the image signals from pixel array 206. Readout circuitry 208 includes, but is not limited to, row and column decoders, column sample and hold circuits, and analog signal processing circuitry.

Timing circuit 210 generates the timing signals used by primary integrated image sensor 202, including the timing signals used by readout circuitry 208. The image signals read out of pixel array 206 are converted to digital image signals by analog-to-digital converter (ADC) 212. The digital image signals are then processed by image signal processing (ISP) circuit 214. Examples of image processing functions performed by ISP circuit 214 include, but are not limited to, color interpolation, white balance, and color and gamma corrections.

Digital input/output circuit 216 outputs, and receives as inputs, image, timing, and control signals via bi-directional signal line 218. Examples of the timing and control signals include, but are not limited to, frame, line, and pixel clock signals. Bi-directional signal line 218 represents a common data bus that can be used to output finished or rendered image signals, or raw (i.e., unprocessed) image signals, to the mobile or handheld device from either primary integrated image sensor 202 or secondary image sensor 204 in an embodiment in accordance with the invention. In other embodiments in accordance with the invention, signal line 218 can be implemented as one or more unidirectional signal lines.

Secondary image sensor 204 includes pixel array 220 for capturing still or video images and readout circuitry 222 to read out signals from pixel array 220. Secondary image sensor 204 is implemented as a CMOS image sensor in an embodiment in accordance with the invention. In another embodiment in accordance with the invention, secondary image sensor 204 is implemented as a CCD image sensor combined with external timing and ADC devices.

When secondary image sensor 204 is implemented as a CMOS image sensor, timing circuit 224 generates the timing signals used by secondary image sensor 204, including the timing signals used by readout circuitry 222. The signals read out of pixel array 220 are converted to digital signals by analog-to-digital converter 226. Digital output circuit 228 outputs the raw digital image signals on signal line 230. The raw digital image signals are then input into primary integrated image sensor 202 via bi-directional signal line 218. The raw digital image signals are processed by image signal processing 214. Digital input/output circuit 216 outputs the rendered images via bi-directional signal line 218.

Secondary image sensor 204 transmits physical and operational data via from digital serial interface 232 to digital serial interface 234 via data bus 236 in an embodiment in accordance with the invention. Storage 240 stores the physical and operational information. Digital serial interfaces 232, 234 can also be operationally connected to one or more components within imaging system 237. Examples of the physical and operation data transmitted by secondary image sensor 204 include, but are not limited to, number of rows and columns, fixed pattern correction data, defect locations, white balance and color correction coefficients, and window of interest.

In other embodiments in accordance with the invention, the physical and operational data transmitted by secondary sensor 204 can be transmitted to primary integrated image sensor 202 using encoded signals in the digital image signals data stream transmitted over bi-directional signal line 218, or through the use of dedicated timing pins (not shown). Primary integrated image sensor 202 stores the physical and operational data in storage 238. Storage 238 is implemented as a set of registers in an embodiment in accordance with the invention. Storage 238 can be implemented differently in other embodiments in accordance with the invention.

ISP circuit 214 on primary integrated image sensor 202 adjusts one or more processed image signals based on the physical and operational data received from secondary image sensor 204. By way of example only, secondary image sensor 204 transmits resolution data, color correction matrix coefficients, or lens shading corrections, to primary integrated image sensor 202. Primary integrated image sensor 202 generates and outputs customized image signals or synchronization signals, such as frame, line, and pixel clock signals, based on the physical and operational data received from secondary image sensor 204.

Figure 3:
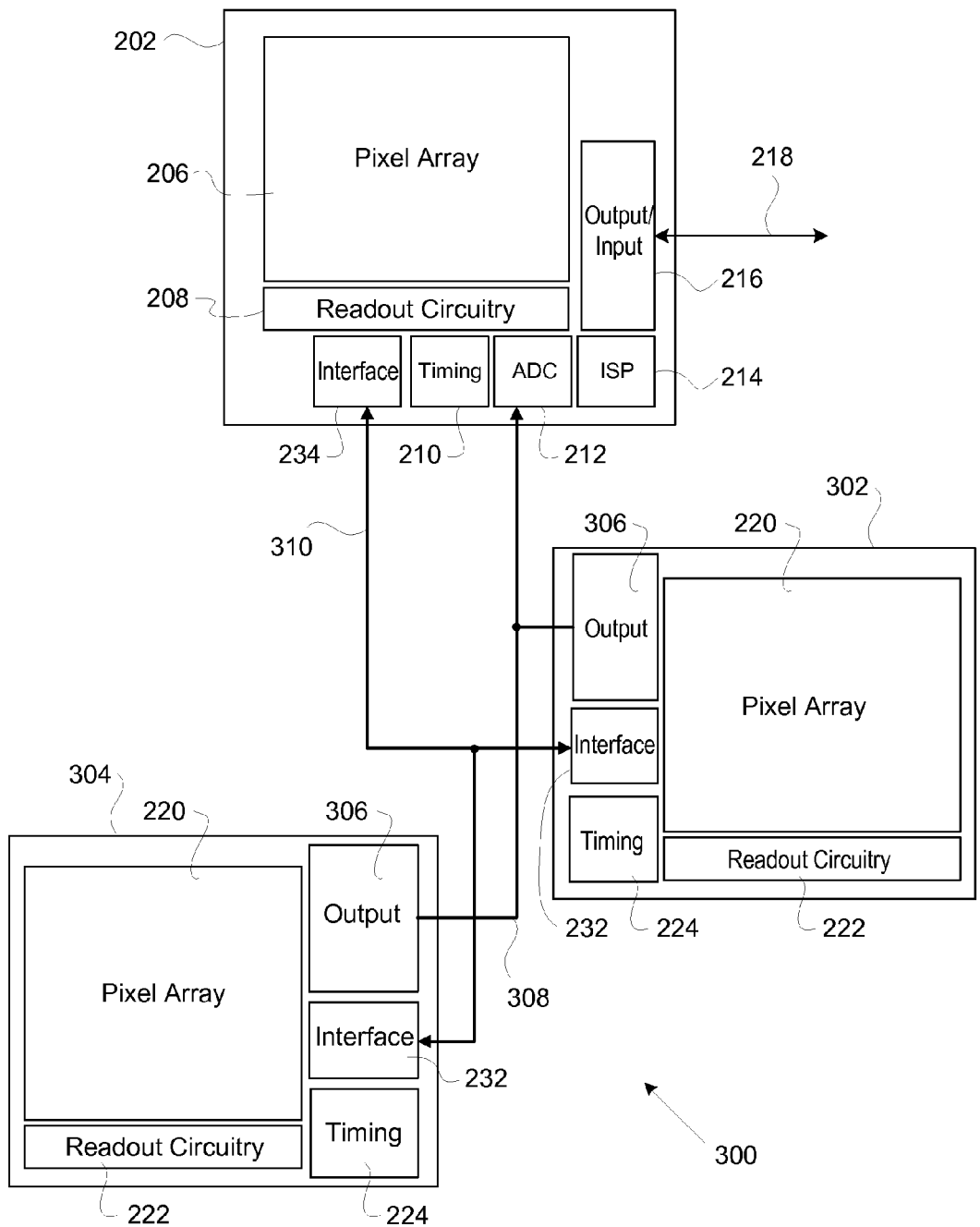
FIG. 3 is a block diagram of a second sensor system in an embodiment in accordance with the invention.

FIG. 3 is a block diagram of a second sensor system in an embodiment in accordance with the invention. Sensor system 300 includes primary integrated image sensor 202 operatively connected to external secondary image sensors 302, 304. At least one of the secondary image sensors 302, 304 is implemented as a CMOS image sensor in an embodiment in accordance with the invention. In another embodiment in accordance with the invention, one or both of secondary image sensors 302, 304 are implemented as a CCD image sensor and separate timing and digital interface chips.

When secondary image sensors 302, 304 are implemented as CMOS image sensors, each secondary image sensor 302, 304 includes pixel array 220, readout circuitry 222, timing circuit 224, and digital serial interface 232 from FIG. 2. Analog output circuit 306 transmits the analog image signals to primary integrated image sensor 202 via signal line 308. ADC 212 on primary integrated image sensor 202 converts the analog image signals to digital image signals. ISP 214 processes the digital image signals and digital input/output circuit 216 then outputs the final or rendered image signals.

Each secondary image sensor 302, 304 transmits physical and operational data via its digital serial interface 232 to digital serial interface 234 via data bus 310 in an embodiment in accordance with the invention. The physical and operational data are stored in storage 238. Primary integrated image sensor 202 generates customized image signals or synchronization signals, such as frame, line, and pixel clock signals, based on the physical and operational data received from secondary image sensor 302, 304.

In an embodiment in accordance with the invention, secondary image sensor 204 (FIG. 2) and secondary image sensors 302, 304 (FIG. 3) are implemented as lower resolution image sensors, such as VGA or 1.3 MP image sensors, while primary integrated image sensor 202 is implemented as a higher resolution image sensor. ISP circuit 214 is typically implemented on primary integrated image sensor 202 because ISP circuit 214 uses a smaller percentage of the die area. The components that form ISP circuit 214 can be fabricated in available or unused areas of the die, usually without increasing the size of the die for primary integrated image sensor 202. The size of the die of secondary image sensor 204 is reduced because secondary image sensor 204 does not include an ISP circuit. ISP circuit 214 on primary integrated image sensor 202 is used to process image signals. Similarly, the size of the dies of secondary image sensors 302, 304 is reduced even more because ADC circuit 212 and ISP circuit 214 are included only on primary integrated image sensor 202 but used by all image sensors 202, 302, 304 in sensor system 300 to process image signals. Removal of ADC circuit 212 can also significantly reduce the pin count, which can lead to a much smaller die size for low resolution sensors.

Figure 1B:
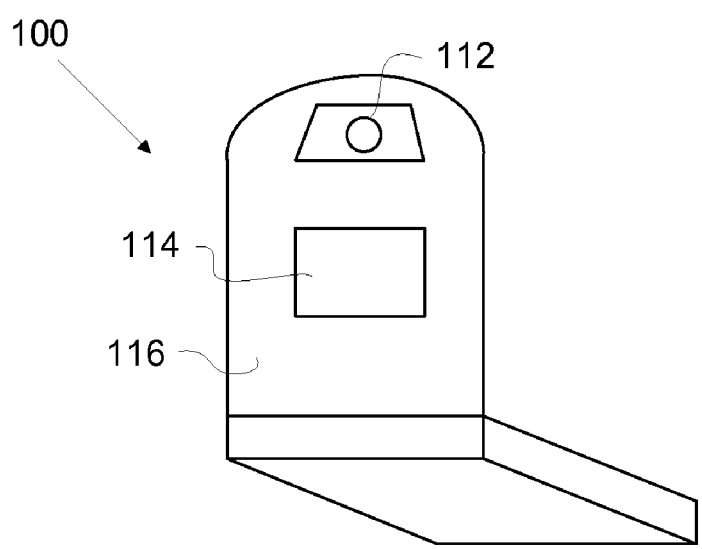
FIG. 1B is a rear perspective view of the cellular phone shown in FIG. 1A.
Figure 4A:
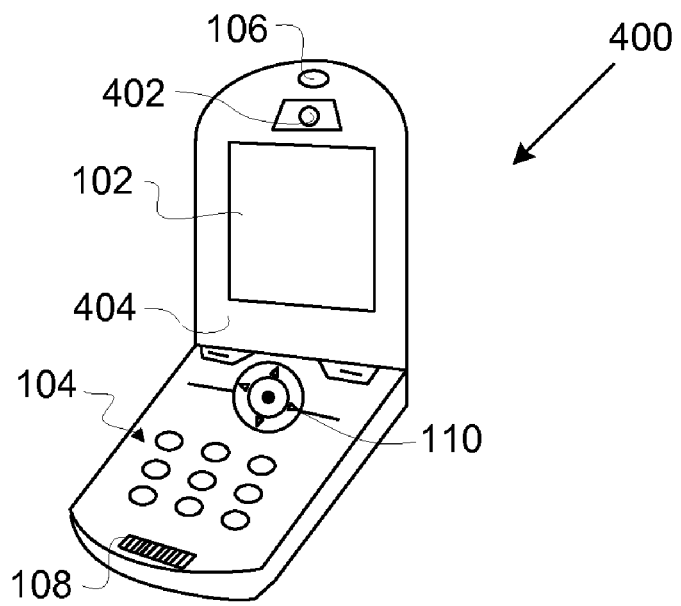
FIG. 4A is a front perspective view of a cellular phone in an embodiment in accordance with the invention.
Figure 4B:
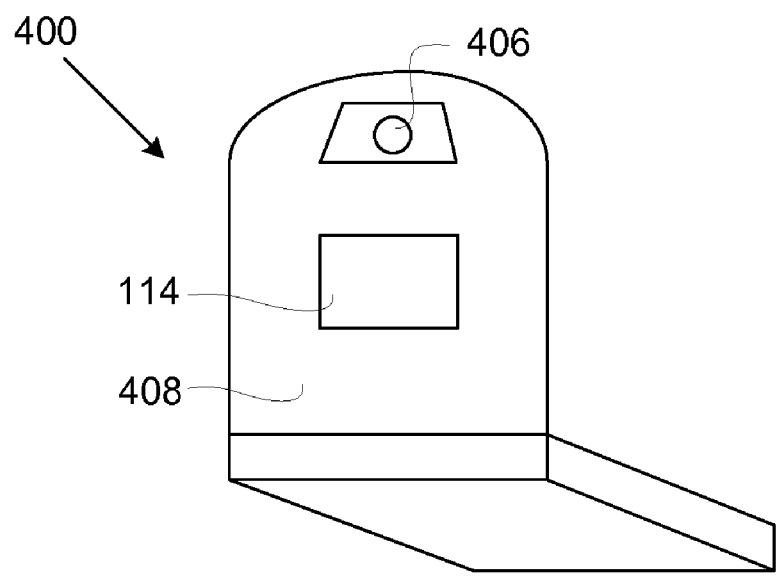
FIG. 4B is a back perspective view of the cellular phone shown in FIG. 4A.

Referring now to FIG. 4A, there is shown a front perspective view of a cellular phone in an embodiment in accordance with the invention. Cellular phone 400 is only one example of an imaging system that can employ the sensor system shown in FIG. 2 or FIG. 3. Cellular phone 400 includes display 102, keyboard 104, speaker 106, microphone 108, user input device 110, and display 114 described with reference to FIGS. 1A-1B. Built-in digital camera device 402 focuses on objects positioned on the inside 404 of cellular phone 400 while built-in digital camera device 406 focuses on objects located on the outside 408 of cellular phone 400. Camera device 406 includes a primary integrated image sensor (e.g., sensor 202 in FIG. 2) while camera device 402 uses a secondary image sensor (e.g., sensor 204 in FIG. 2) in an embodiment in accordance with the invention.

Figure 5:
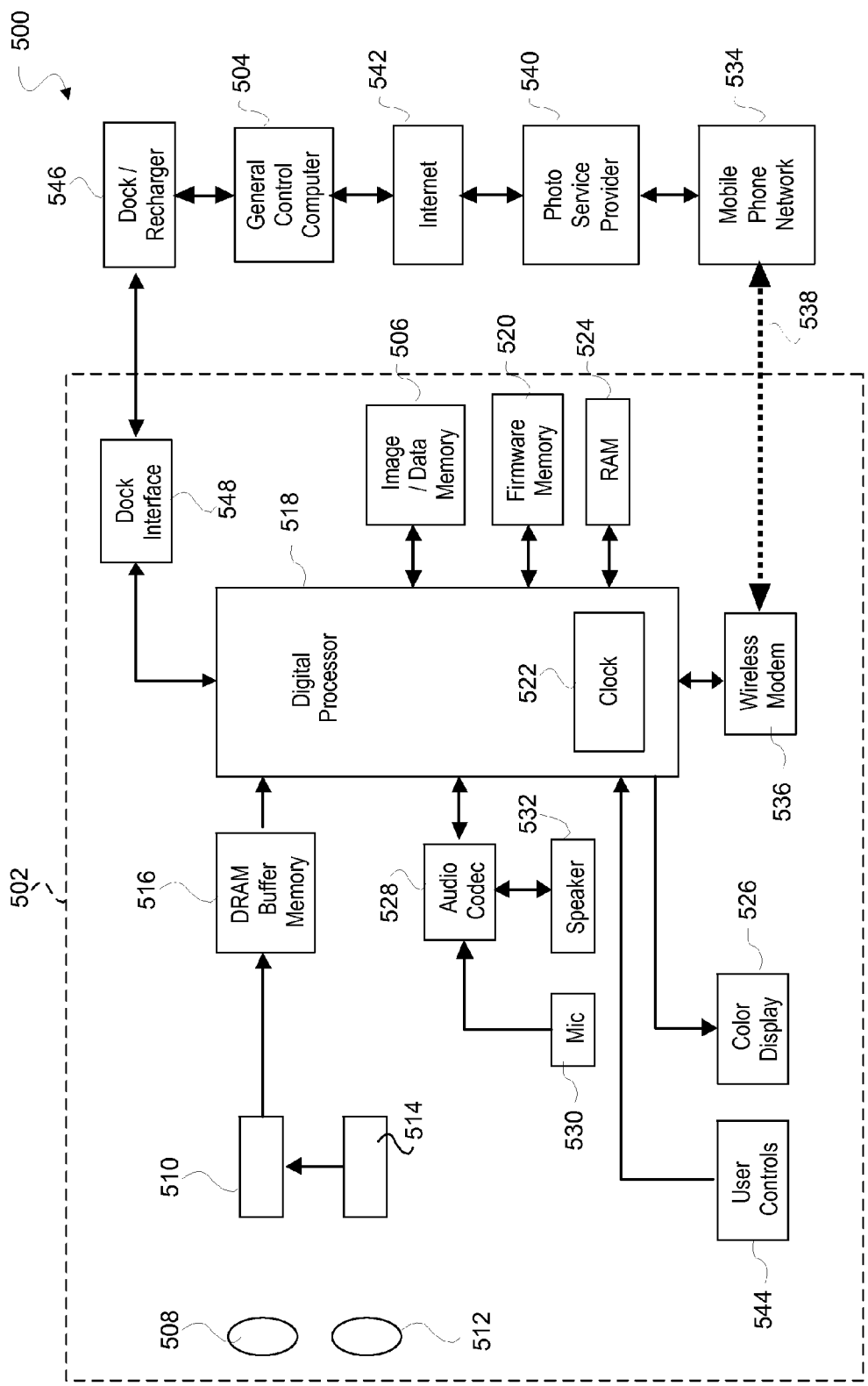
FIG. 5 is a block diagram of an imaging system in an embodiment in accordance with the invention.

FIG. 5 is a block diagram of an imaging system in an embodiment in accordance with the invention. Imaging system 500 includes cellular phone 502 and computing device 504. Digital camera phone 502 produces digital images that are stored in memory 506, which can be, for example, an internal Flash EPROM memory or a removable memory card. Other types of digital image storage media, such as magnetic hard drives, magnetic tape, or optical disks, can alternatively be used to implement memory 506.

Digital camera phone 502 uses lens 508 to focus light from a scene (not shown) onto primary integrated image sensor 510. Digital camera phone 502 uses lens 512 to focus light from a scene (not shown) onto secondary image sensor 514. The rendered images output from primary integrated image sensor 510 are stored in buffer memory 516 and subsequently processed by digital processor 518. Digital processor 518 is controlled by the firmware stored in firmware memory 520, which can be flash EPROM memory. Digital processor 518 includes real-time clock 522, which keeps the date and time even when cellular phone 502 and digital processor 518 are in a low power state. The processed digital image files are stored in memory 506. Memory 506 can also store other types of data, such as, for example, music files (e.g. MP3 files), ring tones, phone numbers, calendars, and to-do lists.

Cellular phone 502 captures still images using primary integrated image sensor 510 and video images using secondary image sensor 514 in an embodiment in accordance with the invention. Digital processor 518 compresses and stores the still and video images as an image file in memory 506. By way of example only, the image data can be compressed pursuant to the JPEG format, which uses the known "Exif" image format. This format includes an Exif application segment that stores particular image metadata using various TIFF tags. Separate TIFF tags can be used, for example, to store the date and time the picture was captured, the lens f/number and other camera settings, and to store image captions.

Digital processor 518 produces different image sizes that are selected by the user in an embodiment in accordance with the invention. One such size is the low-resolution "thumbnail" size image. The thumbnail image is stored in RAM memory 524 and supplied to display 526, which can be, for example, an active matrix LCD or organic light emitting diode (OLED). Generating thumbnail size images allows the captured still images to be reviewed quickly on color display 526.

Audio codec 528 is connected to digital processor 518 and receives an audio signal from microphone (Mic) 530. Audio codec 528 also provides an audio signal to speaker 532. These components are used both for telephone conversations and to record and playback an audio track, along with a video sequence or still image.

Speaker 532 is also used to inform the user of an incoming phone call in an embodiment in accordance with the invention. This can be done using a standard ring tone stored in firmware memory 520, or by using a custom ring-tone downloaded from mobile phone network 534 and stored in memory 506. In addition, a vibration device (not shown) can be used to provide a silent (e.g. non-audible) notification of an incoming phone call.

Digital processor 518 is connected to wireless modem 536, which enables cellular phone 502 to transmit and receive information via radio frequency (RF) channel 538. Wireless modem 536 communicates with mobile phone network 534 using another RF link (not shown), such as a 3GSM network. Mobile phone network 534 communicates with photo service provider 540, which stores images uploaded from cellular phone 502. Other devices, including computing device 504, access these images via the Internet 542. Mobile phone network 534 also connects to a standard telephone network (not shown) in order to provide normal telephone service in an embodiment in accordance with the invention.

A graphical user interface (not shown) is displayed on display 526 and controlled by user controls 544. User controls 544 include dedicated push buttons (e.g. a telephone keypad) to dial a phone number, a control to set the mode (e.g. "phone" mode, "calendar" mode" "camera" mode), a joystick controller that includes 4-way control (up, down, left, right) and a push-button center "OK" or "select" switch, in embodiments in accordance with the invention.

Dock 546 recharges the batteries (not shown) in cellular phone 502. Dock 546 connects cellular phone 502 to computing device 504 via dock interface 548. Dock interface 548 is implemented as a wired interface, such as a USB interface, in an embodiment in accordance with the invention. Alternatively, in other embodiments in accordance with the invention, dock interface 548 is implemented as a wireless interface, such as a Bluetooth or an IEEE 802.11b wireless interface. Dock interface 548 is used to download images from memory 506 to computing device 504. Dock interface 548 is also used to transfer calendar information and other data from computing device 504 to memory 506.

The present invention has been described with reference to a particular embodiment, namely a cellular phone. Other embodiments in accordance with the invention are not limited to this implementation. The present invention can be implemented in any imaging system that employs two or more image sensors. Examples of such imaging systems include, but are not limited to, personal digital assistants, digital still cameras, and digital video cameras.

PARTS LIST 100 cellular phone
102 standard display
104 keyboard
106 speaker
108 microphone
110 user input device
112 built-in digital camera
114 small display
116 outside of cellular phone
118 inside of cellular phone
200 sensor system
202 primary integrated image sensor
204 secondary image sensor
206 pixel array
208 readout circuitry
210 timing circuit
212 analog-to-digital converter (ADC)
214 image signal processing circuit (ISP)
216 digital input/output circuit
218 bi-directional signal line
220 pixel array
222 readout circuitry
224 timing circuit
226 analog-to-digital converter
228 digital output circuit
230 signal line
232 digital serial interface
234 digital serial interface
236 data bus
237 imaging system
238 storage
240 storage
300 sensor system
302 secondary image sensor
304 secondary image sensor
306 analog output circuit
308 signal line
310 data bus
400 cellular phone
402 built-in digital camera device with secondary image sensor
404 inside of cellular phone
406 built-in digital camera device with primary integrated image sensor
408 outside of cellular phone
500 imaging system
502 cellular phone
504 computing device
506 memory
508 lens
510 primary integrated image sensor
512 lens
514 secondary image sensor
516 buffer memory
518 digital processor
520 firmware memory
522 real-time clock
524 RAM memory
526 display
528 audio codec
530 microphone (Mic)
532 speaker
534 mobile phone network
536 wireless modem
538 radio frequency (RF) channel
540 photo service provider
542 internet
544 user controls
546 dock
548 dock interface

The invention claimed is:

1. An imaging system, comprising:
   (a) a primary integrated image sensor comprising:
      a first pixel array for capturing images, wherein each image comprises image signals;
      a first timing circuit for generating timing signals, wherein the timing signals include signals used to read out the image signals from the first pixel array;
      an image signal processing circuit for processing image signals;
      one or more storage circuits operable to store non-image physical and operational information;
      an analog to digital converter for converting the image signals to digital image signals;
      a digital serial interface; and
      a bi-directional digital input/output circuit for receiving digital image signals and outputting processed digital image signals;
   (b) a secondary image sensor operatively connected to the primary integrated image sensor, the secondary image sensor comprising:
      a second pixel array for capturing images, wherein each image comprises image signals;
      a second timing circuit for generating timing signals, wherein the timing signals include signals used to read out the image signals from the second pixel array;
      an analog to digital converter for converting the image signals to digital image signals;
      a digital serial interface; and
      a digital output circuit for outputting digital image signals;
   (c) a data bus connecting the digital serial interface on the primary integrated image sensor to the digital serial interface on the secondary image sensor and the secondary image sensor transmits non-image physical and operational information to the primary integrated image sensor using the data bus, wherein the non-image physical and operational information relates to the secondary image sensor; and
   (d) a bi-directional signal line connected to the bi-directional digital input/output circuit on the primary integrated image sensor, wherein the bi-directional digital input/output circuit on the primary integrated image sensor receives digital image signals from the digital output circuit on the secondary image sensor using the bi-directional signal line and the image signal processing circuit processes the digital image signals received from the secondary image sensor using the non-image physical and operational information received from the secondary image sensor on the data bus, wherein the image signal processing circuit also processes the image signals produced by the first pixel array, and wherein the bi-directional digital input/output circuit on the primary integrated image sensor outputs processed digital image signals using the bi-directional signal line.

2. The imaging system of claim 1, wherein the secondary image sensor further comprises:

one or more storage circuits operable to store the non-image physical and operational information that is transmitted by the digital serial interface on the secondary image sensor to the primary integrated image sensor using the data bus.

3. The imaging system of claim 1, wherein the timing circuit and bi-directional input/output circuit of the primary integrated image sensor responsively output signals specific to the non-image physical and operational information received from the secondary image sensor.

4. An imaging system, comprising:
  (a) a primary integrated image sensor comprising:
    a first pixel array for capturing images, wherein each image comprises image signals;
    a first timing circuit for generating timing signals, wherein the timing signals include signals used to read out the image signals from the first pixel array;
    an image signal processing circuit for processing image signals;
    one or more storage circuits operable to store non-image physical and operational information;
    an analog to digital converter for converting the image signals to digital image signals;
    a digital serial interface; and
    a bi-directional input/output circuit for receiving digital image data and outputting processed digital image signals;
  (b) one or more secondary image sensors each operative connected to the primary integrated image sensor with each secondary image sensor comprising:
    a second pixel array for capturing images, wherein each image comprises image signals;
    a second timing circuit for generating timing signals, wherein the timing signals include signals used to read out the image signals from the second pixel array;
    an analog to digital converter for converting the image signals to digital image signals;
    a digital serial interface; and
    a digital output circuit for outputting digital image signals;
  (c) a data bus connecting the digital serial interface on the primary integrated image sensor to the digital serial interface on the one or more secondary image sensors and each secondary image sensor transmits non-image physical and operational information to the primary integrated image sensor using the data bus, wherein the non-image physical and operational information relates to each secondary image sensor; and
  (d) a bi-directional signal line connected to the bi-directional digital input/output circuit on the primary integrated image sensor, wherein the bi-directional digital input/output circuit on the primary integrated image sensor receives digital image signals from the digital output circuit on each secondary image sensor using the bi-directional signal line and the image signal processing circuit processes the digital image signals received from each secondary image sensor using the non-image physical and operational information received from respective secondary image sensors on the data bus, wherein the image signal processing circuit also processes the image signals produced by the first pixel array, and wherein the bi-directional digital input/output circuit on the primary integrated image sensor outputs processed digital image signals using the bi-directional signal line.

5. The imaging system of claim 4, wherein at least one secondary image sensor comprises:

one or more storage circuits operable to store non-image physical and operational information that is transmitted by the digital serial interface on the at least one secondary image sensor to the primary integrated image sensor using the data bus.

6. The imaging system of claim 4, wherein the timing circuit and bi-directional input/output circuit of the primary integrated image sensor responsively output signals specific to the non-image physical and operational information received from the at least one secondary image sensor.

* * * * *